United States Patent
Cao

(10) Patent No.: US 10,523,494 B2
(45) Date of Patent: Dec. 31, 2019

(54) METHOD AND APPARATUS FOR PROCESSING NETWORK FAILURE

(71) Applicant: BEIJING XIAOMI MOBILE SOFTWARE CO., LTD., Beijing (CN)

(72) Inventor: Dingpeng Cao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/990,952

(22) Filed: May 29, 2018

(65) Prior Publication Data

US 2019/0036761 A1 Jan. 31, 2019

(30) Foreign Application Priority Data

Jul. 27, 2017 (CN) .......................... 2017 1 0623850

(51) Int. Cl.
*H04L 12/24* (2006.01)
*H04L 29/14* (2006.01)
*H04W 4/80* (2018.01)
*H04L 29/06* (2006.01)
*H04W 8/30* (2009.01)
*H04W 88/02* (2009.01)
(Continued)

(52) U.S. Cl.
CPC .............. *H04L 41/06* (2013.01); *H04L 69/22* (2013.01); *H04L 69/40* (2013.01); *H04W 4/80* (2018.02); *H04W 8/30* (2013.01); *H04W 88/023* (2013.01); *G08B 29/02* (2013.01); *H04W 4/00* (2013.01); *H04W 8/005* (2013.01); *H04W 84/18* (2013.01); *Y02D 70/00* (2018.01); *Y02D 70/10* (2018.01); *Y02D 70/14* (2018.01)

(58) Field of Classification Search
CPC ..... H04L 41/16; H04L 41/0672; H04L 43/16; H04W 4/00; H04W 76/26; H04W 254/02; H04W 52/48
See application file for complete search history.

(56) References Cited

U.S. PATENT DOCUMENTS

2004/0242258 A1* 12/2004 Kim ..................... H04W 52/245
455/522
2009/0210141 A1* 8/2009 Young .................. G08G 1/0104
701/119
(Continued)

FOREIGN PATENT DOCUMENTS

CN 106559230 A 4/2017
WO 2016051724 A1 4/2016

OTHER PUBLICATIONS

European Extended Search Report issued in corresponding EP Application No. 18166452.5, dated Oct. 12, 2018, 10 pages.
(Continued)

*Primary Examiner* — Chi Ho A Lee
(74) *Attorney, Agent, or Firm* — Arch & Lake LLP

(57) ABSTRACT

A method and an apparatus are provided for processing a network failure. The method includes followings. A failure identifier corresponding to the network failure is acquired, when detecting the network failure. The failure identifier is added to a Bluetooth broadcast frame, and the Bluetooth broadcast frame is sent to a user terminal, such that the user terminal determines the network failure of a Bluetooth player according to the failure identifier in the Bluetooth broadcast frame and processes the network failure.

11 Claims, 5 Drawing Sheets acquiring a failure identifier corresponding to the network failure, when detecting the network failure — 110 adding the failure identifier to a Bluetooth broadcast frame, and sending the Bluetooth broadcast frame to a user terminal, such that the user terminal determines the network failure of a Bluetooth player according to the failure identifier in the Bluetooth broadcast frame and processes the network failure — 120

(51) Int. Cl.
*H04W 84/18* (2009.01)
*G08B 29/02* (2006.01)
*H04W 4/00* (2018.01)
*H04W 8/00* (2009.01)

(56) References Cited

U.S. PATENT DOCUMENTS

| | | | |
|---|---|---|---|
| 2010/0003967 A1* | 1/2010 | Datta | H04W 4/00 |
| | | | 455/412.1 |
| 2010/0020717 A1* | 1/2010 | McGregor | H04B 17/23 |
| | | | 370/252 |
| 2010/0109185 A1* | 5/2010 | Ogawa | B29C 43/222 |
| | | | 264/177.19 |
| 2015/0126132 A1* | 5/2015 | Chung | H04B 1/3827 |
| | | | 455/67.14 |
| 2015/0271008 A1* | 9/2015 | Jain | H04L 41/0686 |
| | | | 714/57 |
| 2015/0365994 A1 | 12/2015 | Yu | |
| 2016/0198498 A1 | 7/2016 | Wada | |
| 2016/0308748 A1* | 10/2016 | Zuo | H04L 43/103 |
| 2017/0212928 A1* | 7/2017 | Abebe | G06F 16/2453 |
| 2018/0014389 A1* | 1/2018 | Lim Chi Cheung | |
| | | | G06F 3/03547 |
| 2018/0121903 A1* | 5/2018 | Al Salah | G06Q 20/24 |
| 2018/0262021 A1* | 9/2018 | Kim | H02J 7/0026 |

OTHER PUBLICATIONS

First Office Action corresponding to Chinese Application No. 201710623850.0, dated Apr. 24, 2019 and English translation (11p).

\* cited by examiner

METHOD AND APPARATUS FOR PROCESSING NETWORK FAILURE

CROSS REFERENCE TO RELATED APPLICATION

This application is based upon and claims a priority to Chinese Patent Application Serial No. 201710623850.0, filed with the State Intellectual Property Office of P. R. China on Jul. 27, 2017, the entire contents of which are incorporated herein by reference.

TECHNICAL FIELD

The present disclosure relates to the field of Bluetooth technology, and more particularly, to a method and an apparatus for processing a network failure.

BACKGROUND

With the increasing development of Bluetooth technology, a variety of different types of Bluetooth players are more and more. For example, the Bluetooth player includes a Bluetooth speaker, a Bluetooth TV (television) and the like. In the related art, when a Bluetooth player accesses a network, a user terminal may control the Bluetooth player via a specified APP (Application). However, when the Bluetooth player is cut off network access, the user terminal is unable to control the Bluetooth player via the specified APP. Since the user could not know the reason, difficulty in controlling the Bluetooth player by the user is increased.

SUMMARY

According to a first aspect of the present disclosure, there is provided a method for processing a network failure. The method may include: acquiring a failure identifier corresponding to the network failure, when detecting the network failure; and adding the failure identifier to a Bluetooth broadcast frame, and sending the Bluetooth broadcast frame to a user terminal, such that the user terminal determines the network failure of a Bluetooth player according to the failure identifier in the Bluetooth broadcast frame and processes the network failure.

According to a second aspect of the present disclosure, there is provided a method for processing a network failure. The method may include: receiving a Bluetooth broadcast frame sent by a Bluetooth player, in which the Bluetooth broadcast frame carries a failure identifier corresponding to the network failure and detected by the Bluetooth player; and determining the network failure of the Bluetooth player according to the failure identifier, and processing the network failure.

According to a third aspect of the present disclosure, there is provided an apparatus for processing a network failure. The apparatus includes: a processor; a memory, configured to store instructions executable by the processor. The processor is configured to: acquire a failure identifier corresponding to the network failure, when detecting the network failure; and add the failure identifier to a Bluetooth broadcast frame, and send the Bluetooth broadcast frame to a user terminal, such that the user terminal determines the network failure of a Bluetooth player according to the failure identifier in the Bluetooth broadcast frame and processes the network failure.

According to a fourth aspect of the present disclosure, there is provided an apparatus for processing a network failure. The apparatus may include: a processor; a memory, configured to store instructions executable by the processor. The processor is configured to: receive a Bluetooth broadcast frame sent by a Bluetooth player, in which the Bluetooth broadcast frame carries a failure identifier corresponding to the network failure and detected by the Bluetooth player; and determine the network failure of the Bluetooth player according to the failure identifier, and process the network failure.

According to a fifth aspect of the present disclosure, there is provided a non-transitory computer-readable storage medium having stored therein instructions that, when executed by a processor of a device, causes the device to perform any one of the above method for processing a network failure.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first", "second" and "third" are used herein for describing various objects, these objects should not be limited by these terms. These terms are only used for distinguishing one object from another object. For example, a first object may also be called as a second object, and similarly, the second object may also be called as the first object, without departing from the scope of the present disclosure. Depending on the context, the term "if" may be understood to mean "when" or "upon" or "in response to the determination of" or "according to the determination of" or "in response to the detection of", a precondition stated being true.

Figure 1:
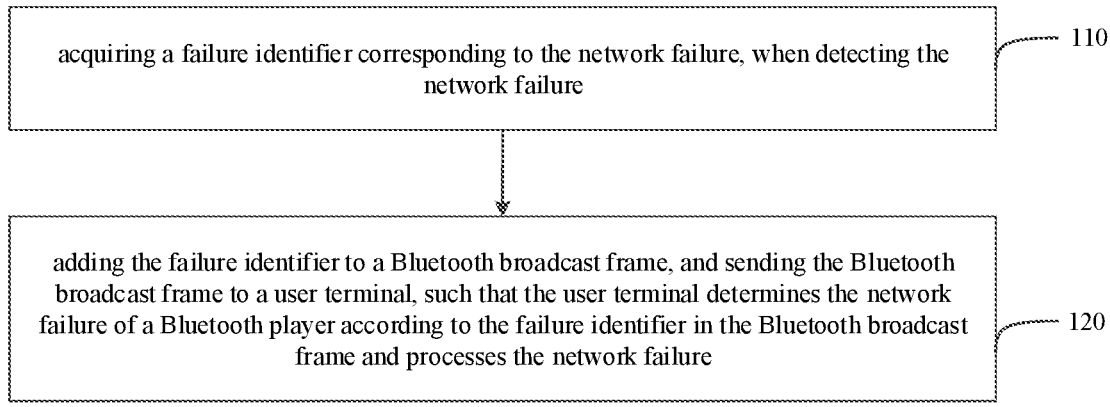
FIG. 1 is a flow chart illustrating a method for processing a network failure according to an aspect of the present disclosure.

As illustrated in FIG. 1, FIG. 1 a flow chart illustrating a method for processing a network failure according to an aspect of the present disclosure. The method may be implemented in a Bluetooth player and may include the followings.

In block 110, a failure identifier corresponding to the network failure is acquired when detecting the network failure.

In embodiments of the present disclosure, the Bluetooth player may be a player with a Bluetooth function and a network access function. For example, the Bluetooth player may specifically be a Bluetooth speaker, a Bluetooth TV and the like. The Bluetooth player may be connected to a user terminal via a wireless local area network (LAN) and may receive a control instruction from the user terminal. When the network failure occurs, the Bluetooth player may also inform the user terminal of the network failure with the Bluetooth function.

In embodiments of the present disclosure, the network failure includes but is not limited to a disconnection of a wireless network or a wired network. For example, the wireless network connected with the Bluetooth speaker has a failure or the wired network connected with the Bluetooth TV has a failure, both of them are the network failure.

In embodiments of the present disclosure, the network identifier corresponds to the network failure. A network failure varies with a failure identifier corresponding thereto. The failure identifier may include numbers, or other characters. For example, when the network failure is the disconnection of the wireless network, the failure identifier corresponding thereto is 01. When the network failure is the disconnection of the wired network, the failure identifier corresponding thereto is 02.

In an embodiment, informing the user terminal of the network failure by the Bluetooth player through the Bluetooth function may include but is not limited to following manners.

When the network failure is detected by the Bluetooth player, Bluetooth low energy is activated.

Furthermore, when it is detected that the network failure is eliminated, the Bluetooth low energy is deactivated.

In embodiments of the present disclosure, the Bluetooth low energy (BLE) is a short distance wireless communication technology with low power consumption. When the network failure is detected by the Bluetooth player, the Bluetooth low energy is activated. When it is detected that the network failure is eliminated, the Bluetooth low energy is deactivated. Since the Bluetooth low energy has a higher speed of sending and receiving a task, a speed of processing the network failure may be increased.

In an embodiment, the method further includes the followings.

A failure identifier database is established. The failure identifier database is configured to store failure identifiers corresponding to various network failures.

In an embodiment, the Bluetooth player may acquire the failure identifier corresponding to the network failure from the failure identifier database.

In block 120, the failure identifier is added to a Bluetooth broadcast frame, and the Bluetooth broadcast frame is sent to a user terminal, such that the user terminal determines the network failure of the Bluetooth player according to the failure identifier in the Bluetooth broadcast frame and processes the network failure.

In embodiments of the present disclosure, the failure identifier may be added at a specified position of the Bluetooth broadcast frame by the Bluetooth player. The specified position is negotiated between the Bluetooth player and the user terminal or is systemically regulated. Thus, it is facilitated to acquire the failure identifier by the user terminal. Furthermore, when the Bluetooth player detects the network failure, the Bluetooth player automatically adds the failure identifier at the specified position in the Bluetooth broadcast frame and sends the Bluetooth broadcast frame to the user terminal.

As can be seen from above embodiments, when the Bluetooth player detects the network failure, the failure identifier corresponding to the network failure may be automatically acquired and the failure identifier may be added to the Bluetooth broadcast frame. The Bluetooth broadcast frame is sent to the user terminal, such that the user terminal determines the network failure of the Bluetooth player according to the failure identifier in the Bluetooth broadcast frame received and processes the network failure. The Bluetooth player may play an audio message when sending the Bluetooth broadcast frame to the user terminal. Therefore, it realizes to rapidly locate, rapidly identify, rapidly process the network failure of the Bluetooth player by the user terminal, thereby improving user experience.

Additionally or alternatively, the broadcast frame may cause the user terminal to activate a specific application that controls the Bluetooth player. When the specific application is activated, the user may easily locate the Bluetooth player by clicking or press a button in the specific application so that a preset audio message is played by the Bluetooth player. The preset audio message may include the type of network failure information or may be pre-selected by a user.

Here, the audio message may be played simultaneously when the Bluetooth player sends the Bluetooth broadcast frame when detecting the paired device is near the Bluetooth player. Additionally or alternatively, the Bluetooth player may also play the same message or a different audio message when the paired device receives the broadcast frame and its content is displayed by the paired device.

Figure 2:
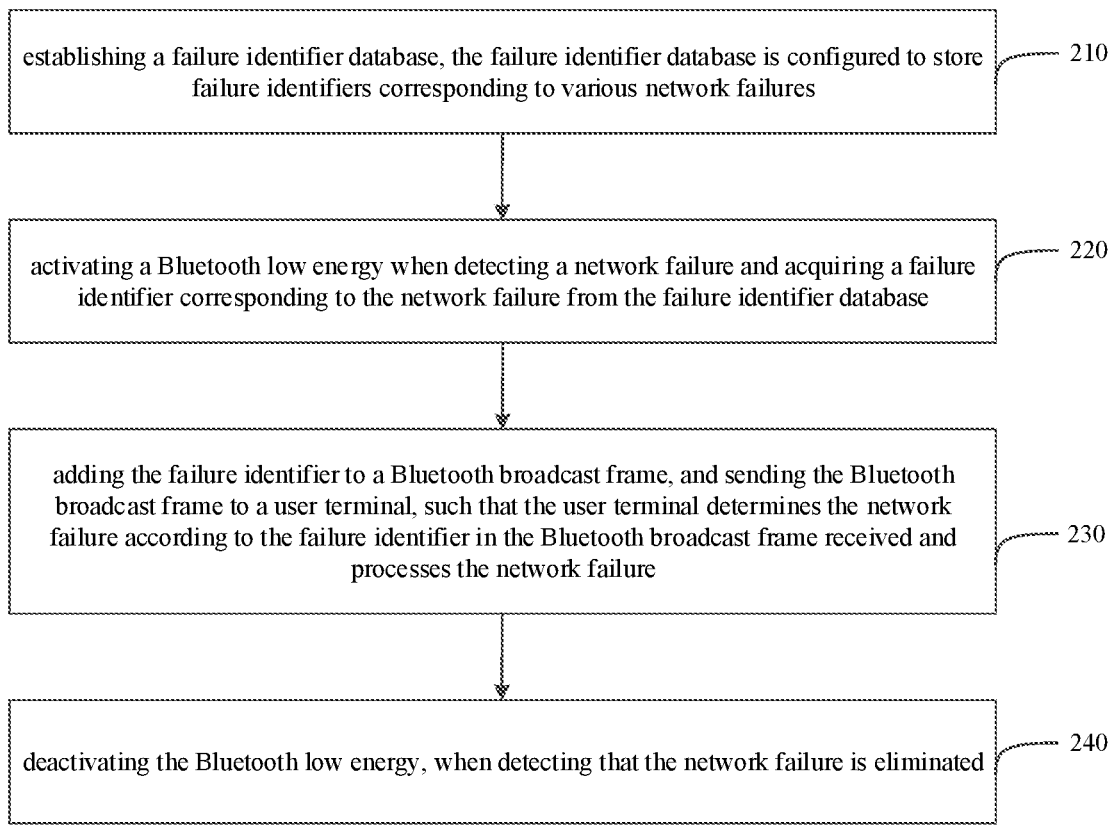
FIG. 2 is a flow chart illustrating another method for processing a network failure according to an aspect of the present disclosure.

As illustrate in FIG. 2, FIG. 2 is a flow chart illustrating another method for processing a network failure according to an aspect of the present disclosure. The method may be implemented in a Bluetooth player and is based on the method illustrated as FIG. 1. The method illustrated as FIG. 2 may include the followings.

In block 210, a failure identifier database is established. The failure identifier database is configured to store failure identifiers corresponding to various network failures.

In block 220, when a network failure is detected, a Bluetooth low energy is activated, and a failure identifier corresponding to the network failure is acquired from the failure identifier database.

In block 230, the failure identifier is added to a Bluetooth broadcast frame and the Bluetooth broadcast frame is sent to a user terminal, such that the user terminal determines the network failure according to the failure identifier in the Bluetooth broadcast frame received and processes the network failure.

In block 240, when it is detected that the network failure is eliminated, the Bluetooth low energy is deactivated.

As can be seen from above embodiments, when the Bluetooth player detects the network failure, the Bluetooth low energy may be activated. The failure identifier corresponding to the network failure is acquired from the failure identifier database. The failure identifier is added to the Bluetooth broadcast frame, and the Bluetooth broadcast frame is sent to the user terminal. When it is detected that the network failure is eliminated, the Bluetooth low energy is deactivated. Since the Bluetooth low energy has a higher speed of sending and receiving a task, a speed of processing the network failure may be increased.

Figure 3:
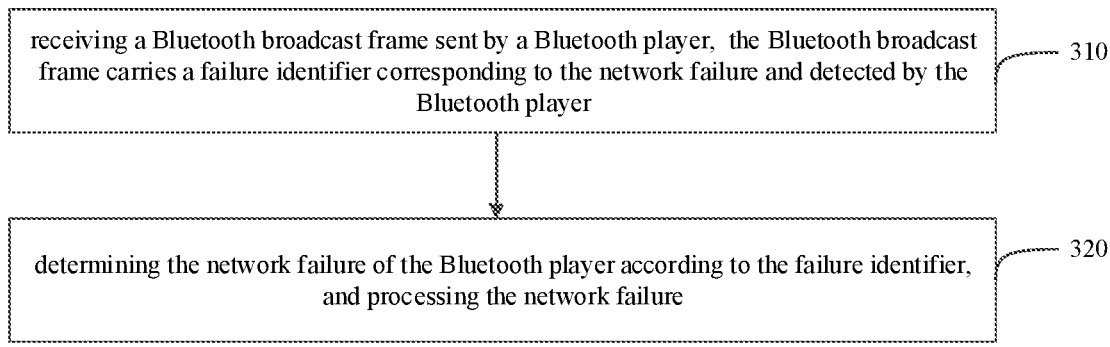
FIG. 3 is a flow chart illustrating another method for processing a network failure according to an aspect of the present disclosure.

As illustrated in FIG. 3, FIG. 3 is a flow chart illustrating another method for processing a network failure according to an aspect of the present disclosure. The method may be implemented in a user terminal and is based on the method illustrated as FIG. 1. The method illustrated as FIG. 3 may include the followings.

In block 310, a Bluetooth broadcast frame sent from the Bluetooth player is received. The Bluetooth broadcast frame carries a failure identifier corresponding to the network failure and detected by the Bluetooth player.

In embodiments of the present disclosure, the user terminal may be a smart terminal with a network access function. For example, the user terminal may be a phone, a tablet computer, a personal digital assistant (PDA) and the like. The user terminal may access to a router through a wireless LAN and access a server of a public network via the router.

In embodiments of the present disclosure, the failure identifier is at a specified position of the Bluetooth broadcast frame. The specified location is negotiated between the Bluetooth player and the user terminal or may be systematically regulated. As a result, the user terminal may read the failure identifier at the specified position.

In block 320, the network failure of the Bluetooth player is determined according to the failure identifier in the Bluetooth broadcast frame, and the network failure is processed.

In embodiments of the present disclosure, the failure identifier in the Bluetooth broadcast frame corresponds to the network failure. For a different network failure, a different failure identifier corresponds thereto. For example, when the failure identifier is 01, the network failure corresponding thereto is a disconnection of a wireless network. When the failure identifier is 02, the network failure corresponding thereto is a disconnection of a wired network.

The user terminal may also store the failure identifier database. The failure identifier database is also configured to store failure identifiers corresponding to various network failures, which is the same to the failure identifier database of the Bluetooth player. As such, after the user terminal receives the Bluetooth broadcast frame sent by the Bluetooth player, the failure identifier may be extracted from the Bluetooth broadcast frame. The failure identifier is searched for from the failure identifier database, such that the network failure corresponding to the failure identifier is determined.

In addition, prompting the user to process the network failure timely after the user terminal determines the corresponding network failure according to the failure identifier in the Bluetooth broadcast frame includes but is not limited to the followings.

A prompt message is generated according to the network failure.

The prompt message is outputted for prompting the user to process the network failure of the Bluetooth player.

For example, when the network failure is the disconnection of the wireless network, the prompt message generated is "the wireless network of the Bluetooth speaker is disconnected, and it requires resetting the wireless network configuration". The above prompt message is outputted in text on a terminal interface or in voice.

As can be seen from above embodiments, the user terminal may directly determine the network failure according to the failure identifier in the Bluetooth broadcast frame, and processes the network failure. Therefore, the speed of processing the network failure may be increased and the user experience may be improved.

Figure 4:
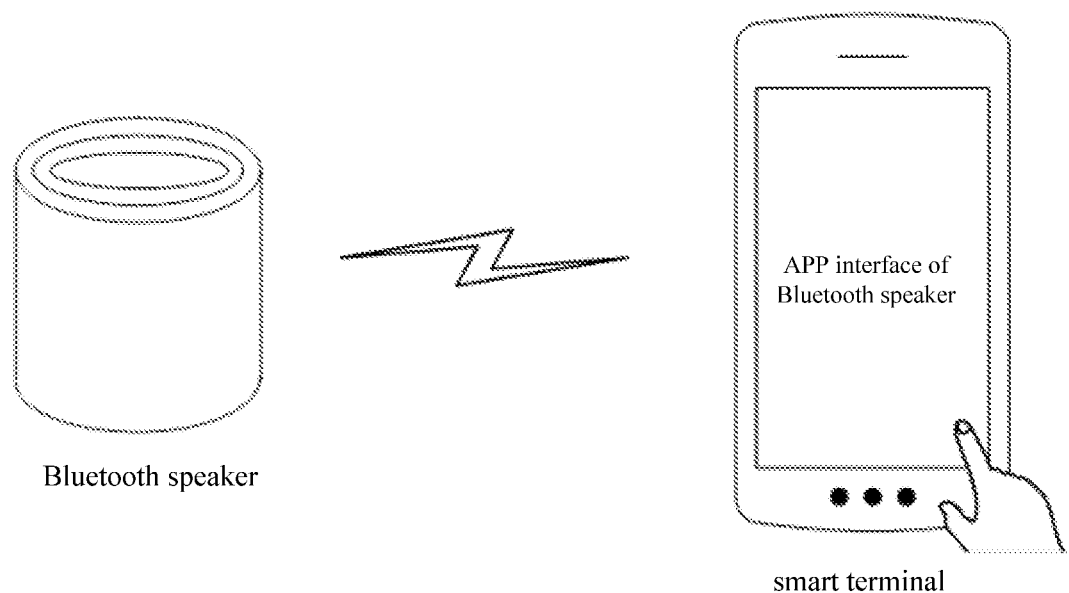
FIG. 4 is a schematic diagram illustrating an application scenario of a method for processing a network failure according to an aspect of the present disclosure.

As illustrated in FIG. 4, FIG. 4 is a schematic diagram illustrating an application scenario of a method for processing a network failure according to an aspect. The application scenario includes a smart phone acting as the user terminal and a Bluetooth speaker acting as the Bluetooth player.

The Bluetooth speaker may access a network via WIFI (wireless fidelity) and may be under control of a speaker APP of the smart phone. When the WIFI is disconnected, the Bluetooth speaker may automatically activate the Bluetooth low energy. Furthermore, a WIFI disconnection identifier may be added to the Bluetooth broadcast frame. By the Bluetooth speaker, the Bluetooth broadcast frame is sent to the smart phone. The smart phone receives the Bluetooth broadcast frame sent by the Bluetooth speaker. When the WIFI disconnection identifier is found, the smart phone may determine that the Bluetooth speaker is disconnected from the WIFI, and prompt the user to reset the WIFI configuration. After the user sets the WIFI configuration and the Bluetooth speaker successfully accesses the WIFI, the Bluetooth low energy of the Bluetooth speaker is deactivated.

In the application scenario illustrated in FIG. 4, a detailed procedure of processing the network failure may be referred to aforementioned descriptions related to FIGS. 1 to 3, which is not elaborated herein.

Corresponding to aforementioned embodiments of the method for processing the network failure, embodiments of the present disclosure further provide a device for processing a network failure.

Figure 5:
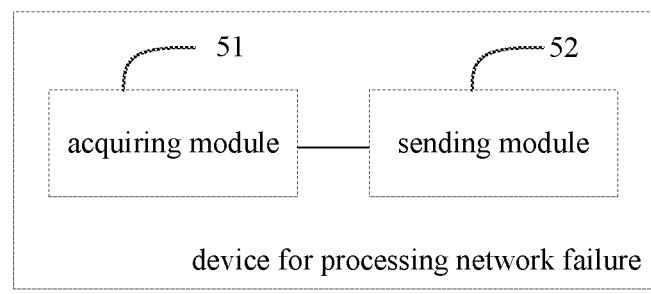
FIG. 5 is a block diagram illustrating a device for processing a network failure according to an aspect of the present disclosure.

As illustrated in FIG. 5, FIG. 5 is a block diagram illustrating a device for processing a network failure according to an aspect of the present disclosure. The device may be applied to a Bluetooth player and may execute the method for processing a network failure illustrated as FIG. 1. The device may include an acquiring module 51 and a sending module 52.

The acquiring module 51 is configured to acquire a failure identifier corresponding to the network failure, when the network failure is detected. The network failure may be a disconnected of a local connected wireless network or a local connected wired network.

The sending module 52 is configured to add the failure identifier to a Bluetooth broadcast frame, and to send the Bluetooth broadcast frame to a user terminal, such that the user determines the network failure of the Bluetooth player according to the failure identifier in the Bluetooth broadcast frame and processes the network failure.

As can be seen from above embodiments, when the Bluetooth player detects the network failure, the failure identifier corresponding to the network failure may be automatically acquired and the failure identifier may be added to the Bluetooth broadcast frame. The Bluetooth broadcast frame is sent to the user terminal, such that the user terminal determines the network failure of the Bluetooth player according to the failure identifier in the Bluetooth broadcast frame received and processes the network failure. Therefore, it realizes to rapidly locate, rapidly identify, rapidly process the network failure of the Bluetooth player by the user terminal, thereby improving user experience.

Figure 6:
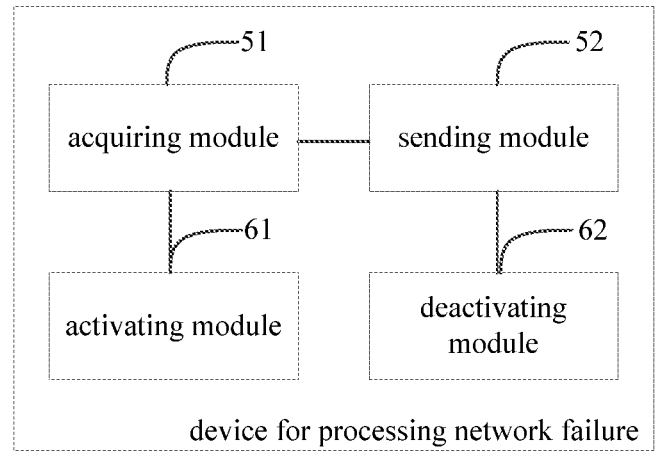
FIG. 6 is a block diagram illustrating another device for processing a network failure according to an aspect of the present disclosure.

As illustrated in FIG. 6, FIG. 6 is a block diagram illustrating another device for processing a network failure according to an aspect of the present disclosure. Embodiments illustrated as FIG. 6 is based on aforementioned embodiments illustrated as FIG. 5. The device includes an activating module 61 and a deactivating module 62.

The activating module 61 is configured to activate a Bluetooth low energy, when the network failure is detected. The network failure may be a disconnected of a local connected wireless network or a local connected wired network.

The deactivating module 62 is configured to deactivate the Bluetooth low energy, when it is detected that the network failure is eliminated.

Figure 7:
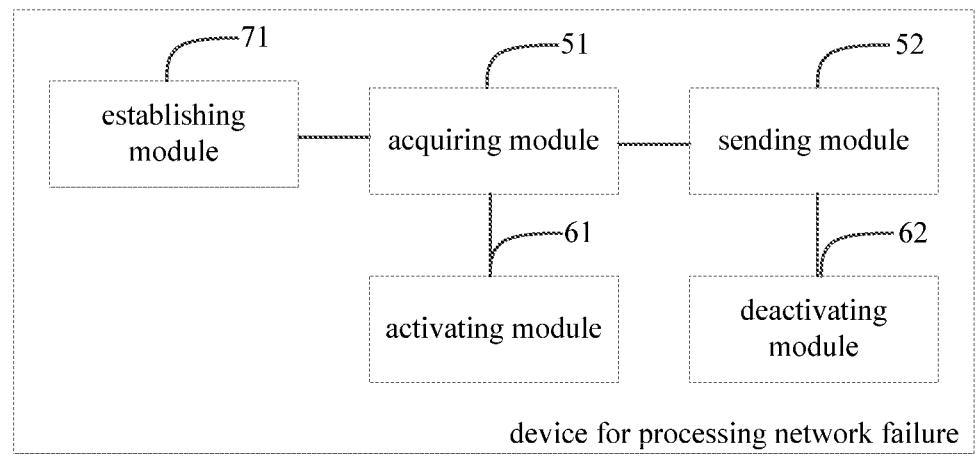
FIG. 7 is a block diagram illustrating another device for processing a network failure according to an aspect of the present disclosure.

As illustrated in FIG. 7, FIG. 7 is a block diagram illustrating another device for processing a network failure according to an aspect of the present disclosure. Embodiments illustrated as FIG. 7 is based on aforementioned embodiments illustrated as FIG. 5 or 6. The device may further include an establishing module 71.

The establishing module 71 is configured to establish a failure identifier database. The failure identifier database is configured to store failure identifiers corresponding to various network failures.

Figure 8:
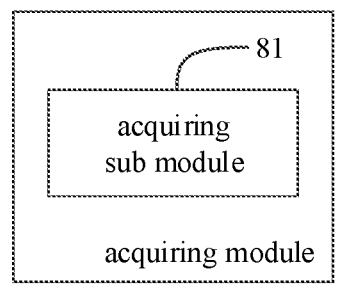
FIG. 8 is a block diagram illustrating another device for processing a network failure according to an aspect of the present disclosure.

As illustrated in FIG. 8, FIG. 8 is a block diagram illustrating another device for processing a network failure according to an aspect of the present disclosure. Embodiments illustrated as FIG. 8 is based on aforementioned embodiments illustrated as FIG. 7. The acquiring module 51 may further include an acquiring sub module 81.

The acquiring sub module 81 is configured to acquire the failure identifier corresponding to the network failure from the failure identifier database.

As can be seen from above embodiments, when the Bluetooth player detects the network failure, the Bluetooth low energy may be activated. The failure identifier corresponding to the network failure is acquired from the failure identifier database. The failure identifier is added to the Bluetooth broadcast frame, and the Bluetooth broadcast frame is sent to the user terminal. When it is detected that the network failure is eliminated, the Bluetooth low energy is deactivated. Since the Bluetooth low energy has a higher speed of sending and receiving a task, a speed of processing the network failure may be increased.

Figure 9:
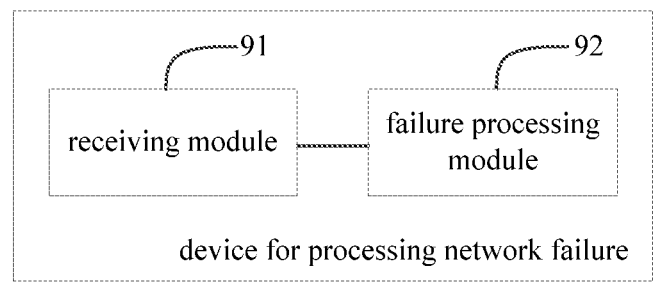
FIG. 9 is a block diagram illustrating a device for processing a network failure according to an aspect of the present disclosure.

As illustrated in FIG. 9, FIG. 9 is a block diagram illustrating a device for processing a network failure according to an aspect of the present disclosure. The device may be applied to a user terminal and is configured to execute the method for processing a network failure illustrated as FIG. 3. The device may include a receiving module 91 and a failure processing module 92.

The receiving module 91 is configured to receive a Bluetooth broadcast frame sent by a Bluetooth player. The Bluetooth broadcast frame carries a failure identifier corresponding to the network failure and detected by the Bluetooth player.

The failure processing module 92 is configured to determine the network failure of the Bluetooth player according to the failure identifier, and to process the network failure.

Figure 10:
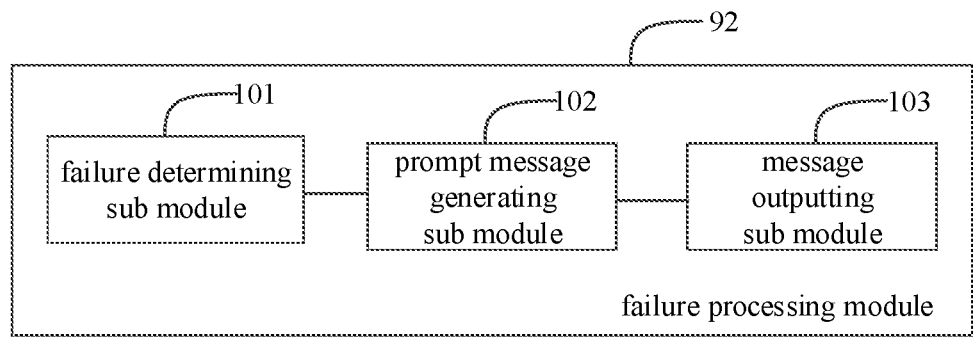
FIG. 10 is a block diagram illustrating another device for processing a network failure according to an aspect of the present disclosure.

As illustrated in FIG. 10, FIG. 10 is a block diagram illustrating another device for processing a network failure according to an aspect of the present disclosure. Embodiments illustrated as FIG. 10 is based on aforementioned embodiments illustrated as FIG. 9. The failure processing module 92 may further include a failure determining sub module 101, a prompt message generating sub module 102 and a message outputting sub module 103.

The failure determining sub module 101 is configured to determine the network failure of the Bluetooth player according to the failure identifier.

The prompt message generating sub module 102 is configured to generate a corresponding prompt message according to the network failure.

The message outputting sub module 103 is configured to output the prompt message, for prompting a user to process the network failure.

As can be seen from above embodiments, the user terminal may directly determine the network failure according to the failure identifier in the Bluetooth broadcast frame, and processes the network failure. Therefore, the speed of processing the network failure may be increased and the user experience may be improved.

Corresponding to FIG. 5, embodiments of the present disclosure further provide an apparatus for processing a network failure. The device may be applied to a Bluetooth player and may include a processor and a memory. The memory is configured to store instructions executable by the processor. The processor is configured to acquire a failure identifier corresponding to the network failure, when detecting the network failure. Furthermore, the processor is configured to add the failure identifier to a Bluetooth broadcast frame, and to send the Bluetooth broadcast frame to a user terminal, such that the user determines the network failure of a Bluetooth player according to the failure identifier in the Bluetooth broadcast frame and processes the network failure.

Corresponding to FIG. 9, embodiments of the present disclosure further provide an apparatus for processing a network failure. The device may be applied to a user terminal and may include a processor and a memory. The memory is configured to store instructions executable by the processor. The processor is configured to receive a Bluetooth broadcast frame sent by a Bluetooth player. The Bluetooth broadcast frame carries a failure identifier corresponding to the network failure and detected by the Bluetooth player. Furthermore, the processor is configured to determine the network failure of the Bluetooth player according to the failure identifier, and to process the network failure.

Detailed implementations of functions and actions of above units in the above devices may be referred to those implementations of blocks in above methods, which are not elaborated herein.

For the device embodiment, related portions may be referred to the method embodiments as the method embodiments correspond to the method embodiments. Those descriptions made to the device embodiments are merely illustrative. The units described as separated parts may be or may not be physically separated. The parts displayed as units may be or may not be physical units. That is, the parts may be at a same position or may be distributed to a plurality of grid units. A part of or all of them may be selected according to actual demands to realize the technical solution of the present disclosure. The method and the device may be implemented by those skilled in the art without any creative labors.

Figure 11:
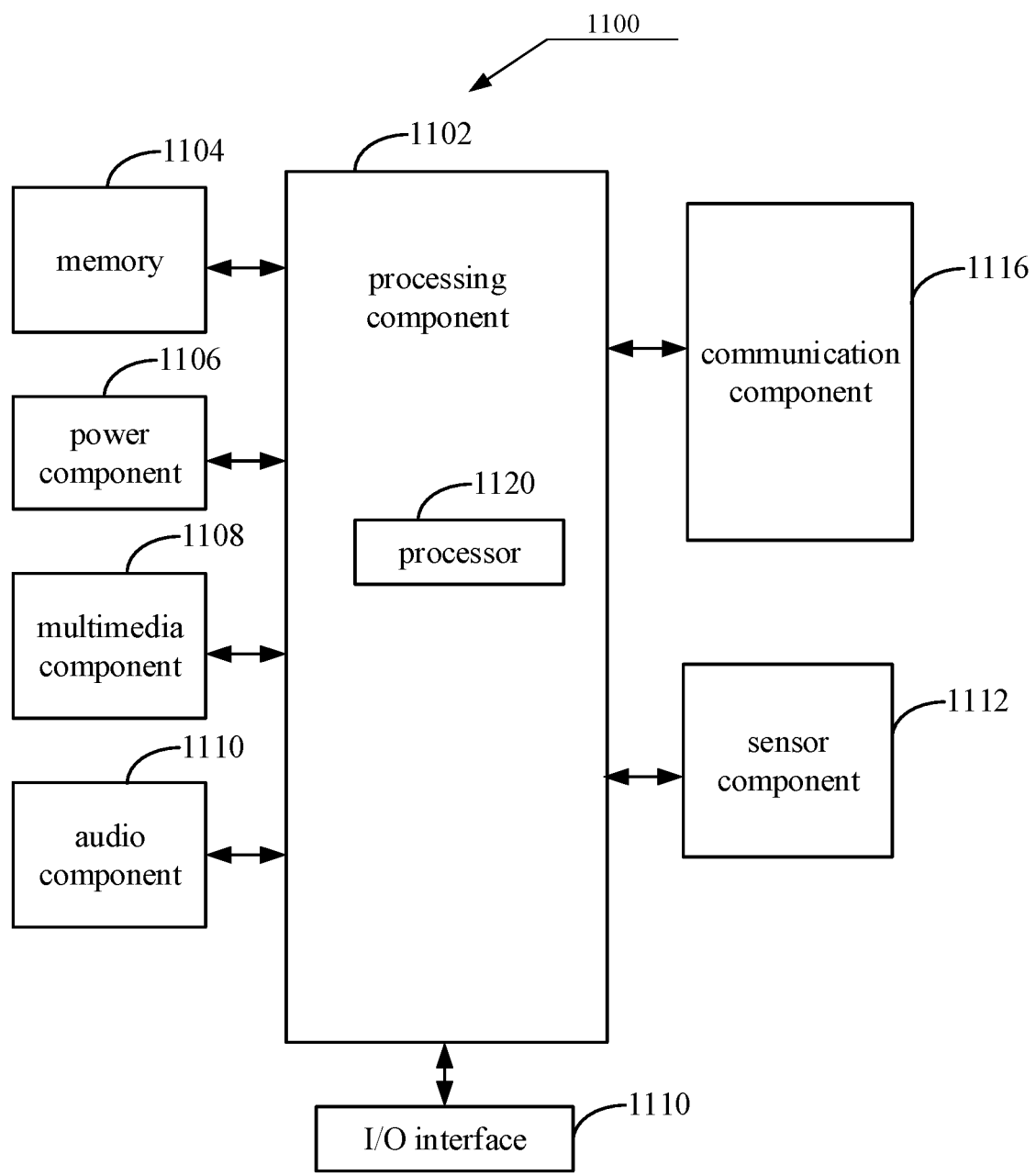
FIG. 11 is a block diagram illustrating an apparatus for processing a network failure according to an aspect of the present disclosure.

FIG. 11 is a block diagram illustrating an apparatus 1100 for processing a network failure according to an aspect of the present disclosure (from a terminal perspective). For example, the apparatus 1100 may be a mobile terminal, a computer, a digital broadcasting terminal, a messaging device, a game console, a tablet device, a medical device, fitness equipment, a Personal Digital Assistant (PDA), and the like, all of them have a routing function.

Referring to FIG. 11, the apparatus 1100 may include the following one or more components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the acts in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some embodiments, the multimedia component 1108 includes a front camera and/or a rear camera. The front camera and/or the rear camera may receive external multimedia data while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface for the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100 and relative positioning of components (e.g. the display and the keypad of the apparatus 1100). The sensor component 1114 may also detect a change in position of the apparatus 1100 or of a component in the apparatus 1100, a presence or absence of user contact with the 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, a microwave sensor or a temperature sensor.

The communication component 1116 is configured to facilitate wired or wireless communication between the apparatus 1100 and other apparatuses. The apparatus 1100 can access a wireless network based on a communication standard, such as WIFI, 2G, or 3G, or a combination thereof. In one aspect, the communication component 1116 receives a broadcast signal or broadcast associated information from an external broadcast management system via a broadcast channel. In one aspect, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method In some embodiments, there is also provided a non-transitory computer readable storage medium having instructions, such as the memory 1104 including instructions. The instructions may be executed by the processors 1120 of the apparatus 1100 to perform the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for processing a network failure, comprising:
   detecting a network failure of a Bluetooth player, wherein the Bluetooth player is connected to a local network;
   acquiring, via a failure identifier database accessible via the local network, a failure identifier corresponding to the detected network failure, wherein the failure identifier database comprises a plurality of failure identifiers corresponding to a plurality of network failures;
   adding the failure identifier at a specified position of a Bluetooth broadcast frame;
   sending the Bluetooth broadcast frame to a user terminal, such that the user terminal determines the network failure of the Bluetooth player according to the failure identifier in the Bluetooth broadcast frame and processes the network failure; and
   generating a prompt on a terminal interface, wherein the prompt directs the user to reset the local network according to the failure identifier.

2. The method according to claim 1, further comprising:
   activating a Bluetooth low energy, when detecting the network failure; and
   deactivating the Bluetooth low energy, when detecting that the network failure is eliminated.

3. The method according to claim 1, wherein the network failure is a disconnection of the local network, wherein the local network is a local connected wireless network or a local connected wired network.

4. The method according to claim 2, further comprising:
   playing an audio message by the Bluetooth player when sending the Bluetooth broadcast frame to the user terminal.

5. An apparatus for processing a network failure, comprising:
   a processor;
   a memory, configured to store instructions executable by the processor;
   wherein the processor is configured to:
   detect a network failure of a Bluetooth player, wherein the Bluetooth player is connected to a local network;
   acquire, via a failure identifier database accessible via the local network, a failure identifier corresponding to the detected network failure, wherein the failure identifier database comprises a plurality of failure identifiers corresponding to a plurality of network failures
   add the failure identifier at a specified position of a Bluetooth broadcast frame;
   send the Bluetooth broadcast frame to a user terminal, such that the user terminal determines the network failure of the Bluetooth player according to the failure identifier in the Bluetooth broadcast frame and processes the network failure; and
   generate a prompt on a user terminal interface the user to reset the local network.

6. The apparatus according to claim 5, wherein the processor is further configured to:
   activate a Bluetooth low energy, when detecting the network failure;
   play an audio message by the Bluetooth player when sending the Bluetooth broadcast frame to the user terminal; and
   deactivate the Bluetooth low energy, when detecting that the network failure is eliminated.

7. The apparatus according to claim 5, wherein the network failure is a disconnection of the local network, wherein the local network is a local connected wireless network or a local connected wired network.

8. A non-transitory computer-readable storage medium having stored therein instructions that, when executed by a processor of a device, causes the device to perform a method for processing a network failure, the method comprising:
   detecting a network failure of a Bluetooth player, wherein the Bluetooth player is connected to a local network;
   acquiring, via a failure identifier database accessible via the local network, a failure identifier corresponding to the detected network failure, wherein the failure identifier database comprises a plurality of failure identifiers corresponding to a plurality of network failures;
   adding the failure identifier at a specified position of a Bluetooth broadcast frame;
   sending the Bluetooth broadcast frame to a user terminal, such that the user terminal determines the network failure of the Bluetooth player according to the failure identifier in the Bluetooth broadcast frame and processes the network failure; and
   generating a prompt on a terminal interface, wherein the prompt directs the user to reset the local network according to the failure identifier.

9. The non-transitory computer-readable storage medium according to claim 8, wherein the method further comprises:
   activating a Bluetooth low energy, when detecting the network failure; and
   deactivating the Bluetooth low energy, when detecting that the network failure is eliminated.

10. The non-transitory computer-readable storage medium according to claim 8, wherein the network failure is a disconnection of the local network, wherein the local network is a local connected wireless network or a local connected wired network.

11. The non-transitory computer-readable storage medium according to claim 9, wherein the method further comprises:

playing an audio message by the Bluetooth player when sending the Bluetooth broadcast frame to the user terminal.

\* \* \* \* \*